US00RE49572E

(19) United States
(12) Reissued Patent
Veregin et al.

(10) Patent Number: US RE49,572 E
(45) Date of Reissued Patent: Jul. 4, 2023

(54) IMAGING PROCESSES

(71) Applicant: XEROX CORPORATION, Norwalk, CT (US)

(72) Inventors: Richard P. N. Veregin, Mississauga (CA); Eric Rotberg, Toronto (CA); Edward Graham Zwartz, Mississauga (CA); Suxia Yang, Mississauga (CA); Daryl W. Vanbesien, Burlington (CA); Cuong Vong, Hamilton (CA); Karen Ann Moffat, Brantford (CA)

(73) Assignee: XEROX CORPORATION, Norwalk, CT (US)

(21) Appl. No.: 17/096,149

(22) Filed: Nov. 12, 2020

Related U.S. Patent Documents

Reissue of:
(64) Patent No.: 10,126,671
Issued: Nov. 13, 2018
Appl. No.: 15/377,680
Filed: Dec. 13, 2016

U.S. Applications:
(63) Continuation of application No. 12/759,069, filed on Apr. 13, 2010, now Pat. No. 9,581,926.

(51) Int. Cl.

| | |
|---|---|
| ***G03G 9/093*** | (2006.01) |
| ***G03G 13/01*** | (2006.01) |
| ***G03G 9/08*** | (2006.01) |
| ***G03G 9/087*** | (2006.01) |
| ***G03G 13/20*** | (2006.01) |
| ***G03G 15/08*** | (2006.01) |

(52) U.S. Cl.
CPC ..... *G03G 9/09371* (2013.01); *G03G 9/0806* (2013.01); *G03G 9/0819* (2013.01); *G03G 9/0821* (2013.01); *G03G 9/08782* (2013.01); *G03G 9/09392* (2013.01); *G03G 13/0133* (2021.01); *G03G 13/20* (2013.01); *G03G 15/08* (2013.01)

(58) Field of Classification Search
CPC ..... G03G 9/09371; G03G 9/08782; G03G 13/0133; G03G 15/08; G03G 9/0821; G03G 9/0806; G03G 9/09392; G03G 13/20; G03G 9/0819
See application file for complete search history.

(56) References Cited

U.S. PATENT DOCUMENTS

| | | | | |
|---|---|---|---|---|
| 3,590,000 | A | 6/1971 | Palermiti et al. | |
| 3,681,106 | A | 8/1972 | Burns et al. | |
| 3,800,588 | A | 4/1974 | Larson et al. | |
| 3,847,604 | A | 11/1974 | Hagenbach et al. | |
| 4,295,990 | A | 10/1981 | Verbeek et al. | |
| 4,298,672 | A | 11/1981 | Lu | |
| 4,338,390 | A | 7/1982 | Lu | |
| 4,533,614 | A | 8/1985 | Fukumoto et al. | |
| 4,845,006 | A | 7/1989 | Matsubara et al. | |
| 4,863,824 | A | 9/1989 | Uchida et al. | |
| 4,863,825 | A | 9/1989 | Yoshimoto et al. | |
| 4,917,983 | A | 4/1990 | Uchida et al. | |
| 4,931,370 | A | 6/1990 | Amaya et al. | |
| 4,933,252 | A | 6/1990 | Nishikawa et al. | |
| 4,935,326 | A | 6/1990 | Creatura et al. | |
| 4,937,166 | A | 6/1990 | Creatura et al. | |
| 4,957,774 | A | 9/1990 | Doi et al. | G03G 15/2064 427/256 |
| 4,973,539 | A | 11/1990 | Sacripante et al. | |
| 4,980,448 | A | 12/1990 | Tajiri et al. | |
| 4,981,939 | A | 1/1991 | Matsumura et al. | |
| 4,988,794 | A | 1/1991 | Kubo et al. | |
| 5,057,596 | A | 10/1991 | Kubo et al. | |
| 5,143,809 | A | 9/1992 | Kaneko et al. | |
| 5,227,460 | A | 7/1993 | Mahabadi et al. | |
| 5,236,629 | A | 8/1993 | Mahabadi et al. | |
| 5,290,654 | A | 3/1994 | Sacripante et al. | |
| 5,302,486 | A | 4/1994 | Patel et al. | |
| 5,330,874 | A | 7/1994 | Mahabadi et al. | |
| 5,376,494 | A | 12/1994 | Mahabadi et al. | |
| 5,480,756 | A | 1/1996 | Mahabadi et al. | |
| 5,500,324 | A | 3/1996 | Mahabadi et al. | |
| 5,601,960 | A | 2/1997 | Mahabadi et al. | |
| 5,629,121 | A | 5/1997 | Nakayama | |
| 5,650,484 | A | 7/1997 | Hawkins et al. | |
| 5,750,909 | A | 5/1998 | Hawkins et al. | |
| 6,063,827 | A * | 5/2000 | Sacripante | C08G 63/676 430/114 |
| 6,214,507 | B1 | 4/2001 | Sokol et al. | |
| 6,326,119 | B1 | 12/2001 | Hollenbaugh et al. | |
| 6,358,657 | B1 | 3/2002 | Silence et al. | |
| 6,359,105 | B1 | 3/2002 | Ianni et al. | |
| 6,592,913 | B2 | 7/2003 | Cook et al. | |
| 6,593,053 | B1 | 7/2003 | Chang et al. | |
| 7,153,623 | B2 | 12/2006 | Akazawa et al. | |
| 7,329,476 | B2 | 2/2008 | Sacripante et al. | |
| 7,368,214 | B2 * | 5/2008 | Ishiyama | G03G 9/0821 430/108.1 |
| 7,546,069 | B2 | 6/2009 | Kumar et al. | |
| 8,211,611 | B2 * | 7/2012 | Ou | G03G 9/0806 430/137.1 |
| 8,431,318 | B2 | 4/2013 | Vanbesien et al. | |
| 8,617,780 | B2 * | 12/2013 | Gong | G03G 9/0812 430/108.3 |
| 8,722,299 | B2 * | 5/2014 | Sacripante | G03G 9/0819 430/108.8 |
| 9,201,321 | B2 * | 12/2015 | Qiu | G03G 9/0804 |
| 9,740,124 | B2 * | 8/2017 | Sacripante | G03G 9/08755 |
| 2004/0197693 | A1 | 10/2004 | Ninomiya et al. | |
| 2006/0063086 | A1 | 3/2006 | Sacripante et al. | |

(Continued)

*Primary Examiner* — Ling X Xu

(74) *Attorney, Agent, or Firm* — Vorys, Sater, Seymour and Pease LLP

(57) ABSTRACT

The present disclosure provides processes for producing images with toner particles. In embodiments, toner particles of a certain diameter in size are applied to a substrate as an incomplete monolayer, and then fused to form an image that is a complete monolayer and possesses a thickness less than the diameter of the particles utilized to form the image.

43 Claims, 7 Drawing Sheets

(56) References Cited

U.S. PATENT DOCUMENTS

| | | | | |
|---|---|---|---|---|
| 2006/0216626 | A1 | 9/2006 | Sacripante et al. | |
| 2007/0092822 | A1* | 4/2007 | Matsumura | G03G 9/0804 430/109.4 |
| 2008/0107990 | A1 | 5/2008 | Field et al. | |
| 2008/0199797 | A1* | 8/2008 | Sacripante | G03G 9/0804 430/104 |
| 2008/0236446 | A1 | 10/2008 | Zhou et al. | |
| 2009/0047593 | A1 | 2/2009 | Vanbesien et al. | |
| 2010/0055592 | A1* | 3/2010 | Zhou | G03G 9/0804 430/108.4 |
| 2010/0310983 | A1* | 12/2010 | Ou | G03G 9/09392 430/137.14 |
| 2011/0143274 | A1* | 6/2011 | Iftime | G03G 9/08755 430/108.4 |
| 2011/0196066 | A1* | 8/2011 | Faucher | C08L 67/02 523/335 |
| 2011/0250535 | A1 | 10/2011 | Vanbesien et al. | |
| 2012/0156607 | A1* | 6/2012 | Farrugia | G03G 9/08795 430/108.4 |

* cited by examiner

IMAGING PROCESSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a continuation of, and claims the benefit of priority to, U.S. patent application Ser. No. 12/759,069, filed Apr. 13, 2010, the entire contents of which is incorporated herein by reference.

BACKGROUND

The present disclosure relates to processes useful in providing toners suitable for electrophotographic apparatuses, including digital, image-on-image, and similar apparatuses. The use of such toners in forming images is also provided.

Toner blends containing crystalline or semi-crystalline polyester resins with an amorphous resin have recently been shown to provide very desirable ultra low melt fusing, which is important for both high-speed printing and lower fuser power consumption. These types of toners containing crystalline polyesters have been demonstrated suitable for both emulsion aggregation (EA) toners, and in conventional jetted toners. Combinations of amorphous and crystalline polyesters may provide toners with relatively low-melting point characteristics (sometimes referred to as low-melt, ultra low melt or ULM), which allows for more energy-efficient and faster printing.

The development of highly pigmented toners may affect the toner formation process, with difficulties arising in forming toner particles having a desired size and shape. The use of such toners in producing images may also provide some challenges, especially where the desired thickness of an image is less than the diameter of the toner particles.

Improved methods for producing toner remain desirable, as are methods for producing images with such toner.

SUMMARY

The present disclosure provides processes for producing images with toner particles, as well as images produced thereby. In embodiments, a process of the present disclosure includes applying emulsion aggregation toner particles to a substrate; and fusing the toner particles to the substrate to form an image; wherein the image for a 100% solid area single color patch has a thickness of from about 1 μm to about 5 μm, and wherein the thickness of that image is less than about 70% of a diameter of the toner particles.

In other embodiments, a process of the present disclosure includes forming toner particles including at least one polyester resin, at least one colorant, at least one surfactant, and an optional wax; applying the toner particles to a substrate to form an incomplete monolayer; and fusing the toner particles to the substrate to form an image; wherein the image includes a complete monolayer having a thickness from about 1 μm to about 5 μm, and wherein the thickness of the image is less than about 70% of a diameter of the toner particles.

In yet other embodiments, a process of the present disclosure includes contacting at least one polyester resin with at least one colorant, at least one surfactant, and an optional wax to form an emulsion possessing small particles; aggregating the small particles; adding a metal salt such as copper, iron, and alloys thereof to the small particles; coalescing the aggregated particles to form toner particles; recovering the toner particles; applying the toner particles to a substrate to form an incomplete monolayer; and fusing the toner particles to the substrate to form an image; wherein the image includes a complete monolayer having a thickness from about 1 μm to about 5 μm, and wherein the thickness of the image is less than about 70% of a diameter of the toner particles.

BRIEF DESCRIPTION OF THE FIGURES

Various embodiments of the present disclosure will be described herein below with reference to the figures wherein.

DETAILED DESCRIPTION OF EMBODIMENTS

Figure 1:
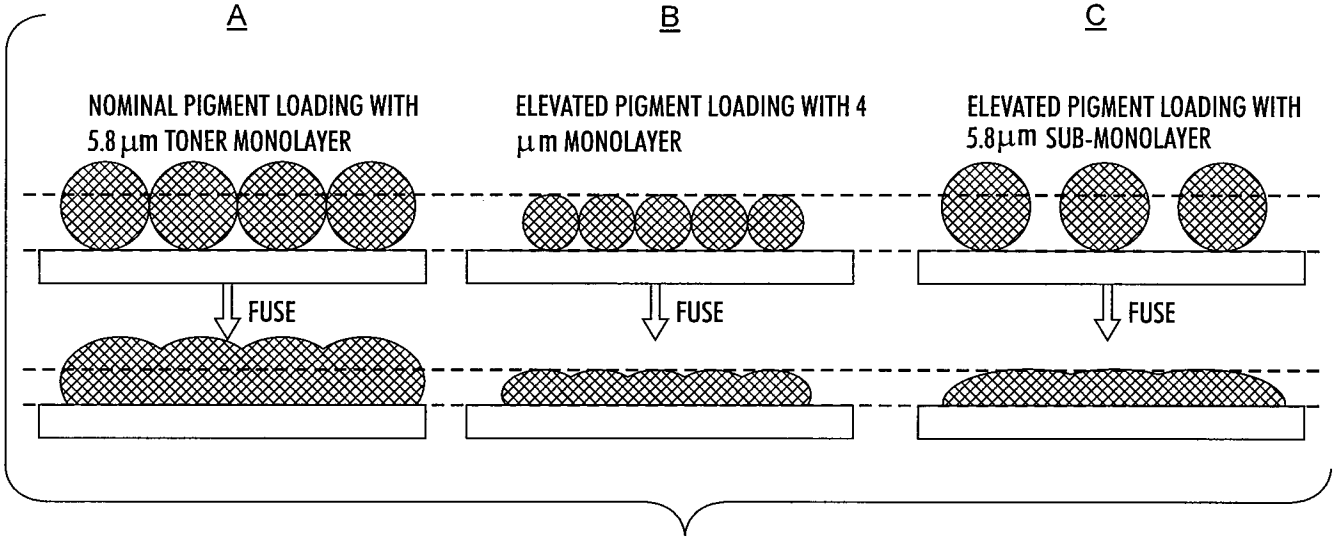
FIG. 1 depicts formation of an image with a toner of the present disclosure compared with a smaller toner having elevated pigment loading and a comparative toner with nominal pigment.
Figure 2A:
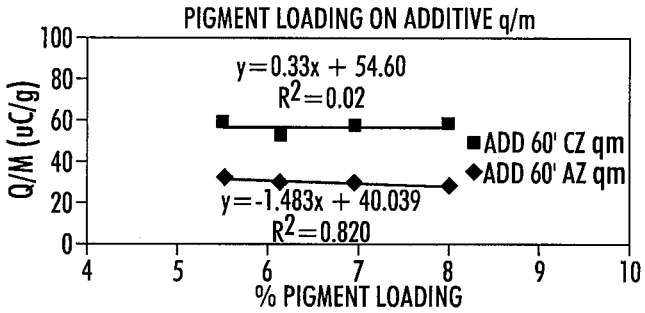
FIGS. 2A-D are graphs depicting A-zone and C-zone charging as a function of pigment loading (FIGS. 2A and 2B) and particle size (FIGS. 2C and 2D) for toners of the present disclosure compared with comparative toners.
Figure 2B:
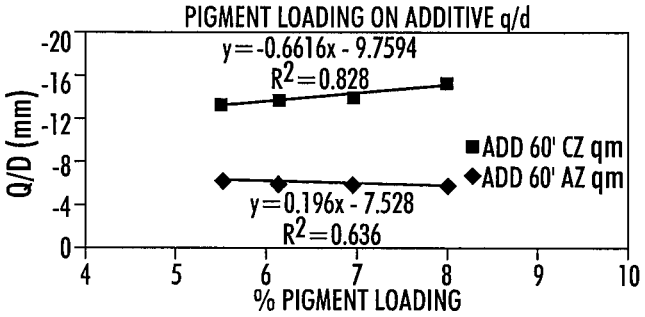
Figure 2C:
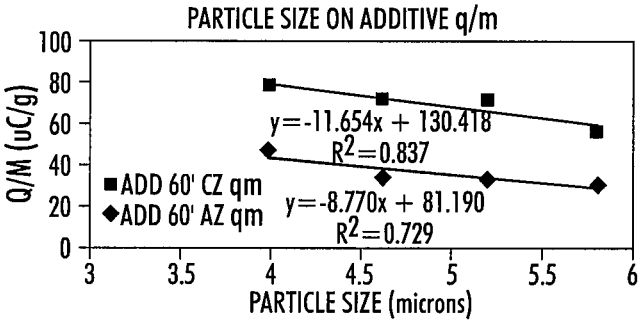
Figure 2D:
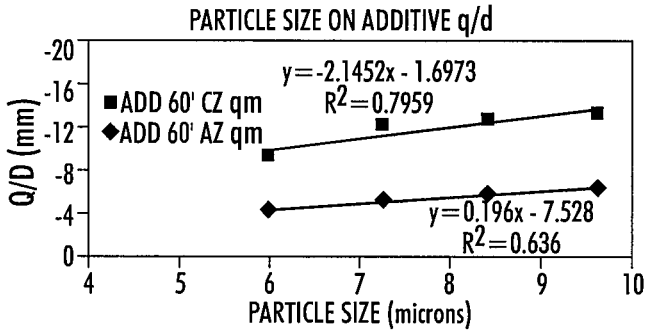

The present disclosure provides a printing process and toner, whereby the toner layer thickness is reduced without a change in the toner particle size, such that the layer thickness of a color layer on the print is thinner than the toner particle diameter.

In embodiments, the present disclosure provides processes for the preparation of toner particles, which include adding a transition metal powder and/or a transition metal salt to toner particles during an emulsion aggregation synthesis to facilitate rapid coalescence of the toner particles, with the toner particles possessing a high degree of circularity.

Toners of the present disclosure may include a latex resin in combination with a pigment. While the latex resin may be prepared by any method within the purview of those skilled in the art, in embodiments the latex resin may be prepared by emulsion polymerization methods, including semi-continuous emulsion polymerization, and the toner may include emulsion aggregation toners. Emulsion aggregation involves aggregation of both submicron latex and pigment particles into toner size particles, where the growth in particle size is, for example, in embodiments from about 0.1 μm to about 15 μm.

Resins

Any toner resin may be utilized in the processes of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various melting points of, for example, from about 30° C. to about 120° C., in embodiments from about 75° C. to about 115° C., in embodiments from about 100° C. to about 110° C., and/or in embodiments from about 104° C. to about 108° C. As used herein, the low molecular weight amorphous polyester resin has, for example, a number average molecular weight ($M_n$), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight ($M_w$) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution ($M_w/M_n$) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly (co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable linear amorphous polyester resin may be a poly(propoxylated bisphenol A co-fumarate) resin having the following formula (I):

(I)

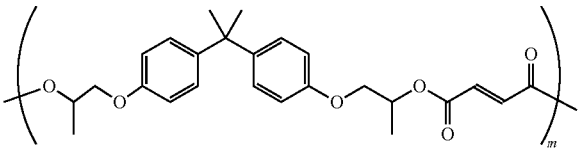

wherein m may be from about 5 to about 1000.

An example of a linear propoxylated bisphenol A fumarate resin which may be utilized as a latex resin is available under the trade name SPARII™ from Resana S/A Industrias Quimicas, Sao Paulo Brazil. Other suitable linear resins include those disclosed in U.S. Pat. Nos. 4,533,614[.] *and* 4,957,774[and 4,533,614], which can be linear polyester resins including terephthalic acid, dodecylsuccinic acid, trimellitic acid, fumaric acid and alkyloxylated bisphenol A, such as, for example, alkylene oxide adducts of bisphenol A, including bisphenol-A ethylene oxide adducts and bisphenol-A propylene oxide adducts. Examples of other alkylene oxide adducts of bisphenol which may be utilized include polyoxypropylene (2.2)-2,2-bis(4-hydroxyphenyl) propane, polyoxypropylene (3.3)-2,2-bis(4-hydroxyphenyl) propane, polyoxyethylene (2.0)-2,2-bis(4-hydroxyphenyl) propane, polyoxyethylene (2.2)-2,2-bis(4-hydroxyphenyl) propane, polyoxypropylene (2.0)-polyoxyethylene (2.0)-2,2-bis(4-hydroxyphenyl) propane, and polyoxypropylene (6)-2,2-bis (4-hydroxyphenyl) propane. These compounds may be used singly or in a combination of two or more thereof. Other propoxylated bisphenol A terephthalate resins that may be utilized and are commercially available include GTU-FC 115, commercially available from Kao Corporation, Japan, and the like.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-isophthalate, polypropylene-isophthalate, polybutylene-isophthalate, polypentylene-isophthalate, polyhexalene-isophthalate, polyheptadene-isophthalate, polyoctalene-isophthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(ethoxylated bisphenol A-fumarate), poly (ethoxylated bisphenol A-succinate), poly(ethoxylated bisphenol A-adipate), poly(ethoxylated bisphenol A-glutarate), poly(ethoxylated bisphenol A-terephthalate), poly (ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly (propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL (Reichhold Inc), ARAKOTE (Ciba-Geigy Corporation), HETRON (Ashland Chemical), PARAPLEX (Rohm & Haas), POLYLITE (Reichhold Inc), PLASTHALL (Rohm & Haas), CYGAL (American Cyanamide), ARMCO (Armco Composites), ARPOL (Ashland Chemical), CELANEX (Celanese Eng), RYNITE (DuPont), STYPOL (Freeman Chemical Corporation) and combinations thereof. The resins can also be functionalized, such as carboxylated, sulfonated, or the like, and particularly such as sodio sulfonated, if desired.

The low molecular weight linear amorphous polyester resins are generally prepared by the polycondensation of an organic diol, a diacid or diester, and a polycondensation catalyst. The low molecular weight amorphous resin is generally present in the toner composition in various suitable amounts, such as from about 60 to about 90 weight percent, in embodiments from about 50 to about 65 weight percent, of the toner or of the solids.

Examples of organic diols selected for the preparation of low molecular weight resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of diacid or diesters selected for the preparation of the low molecular weight amorphous polyester include dicarboxylic acids or diesters such as terephthalic acid, phthalic acid, isophthalic acid, fumaric acid, citraconic acid, glutaconic acid, cyclohexanedicarboxylic acid, maleic acid, itaconic acid, succinic acid, succinic anhydride, dodecylsuccinic acid, dodecylsuccinic anhydride, dodecenylsuccinic acid, dodecenylsuccinic anhydride, n-butylsuccinic acid, n-butenylsuccinic acid, isobutylsuccinic acid, isobutenylsuccinic acid, n-octylsuccinic acid, n-octenylsuccinic acid, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, dimethyl dodecenylsuccinate, and mixtures thereof. The organic diacid or diester is selected, for example, from about 45 to about 52 mole percent of the resin.

Examples of suitable polycondensation catalyst for either the low molecular weight amorphous polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Linear or branched unsaturated polyesters selected for the in situ pre-wise reactions between both saturated and unsaturated diacids (or anhydrides) and dihydric alcohols (glycols or diols). The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions. Typical unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature of from about 30° C. to about 80° C., in embodiments from about 35° C. to about 70° C. In further embodiments, the combined amorphous resins may have a melt viscosity of from about 10 to about 1,000,000 Pa*S at about 130° C., in embodiments from about 50 to about 100,000 Pa*S.

The monomers used in making the selected amorphous polyester resin are not limited, and the monomers utilized may include any one or more of, for example, ethylene, propylene, and the like. Known chain transfer agents, for example dodecanethiol or carbon tetrabromide, can be utilized to control the molecular weight properties of the polyester. Any suitable method for forming the amorphous or crystalline polyester from the monomers may be used without restriction.

The amount of the low molecular weight amorphous polyester resin in a toner particle of the present disclosure, whether in core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin, in embodiments a crystalline polyester resin. As used herein, a "crystalline polyester resin" includes a resin that shows, not a stepwise endothermic amount variation, but a clear endothermic peak in differential scanning calorimetry (DSC). However, a polymer obtained by copolymerizing the crystalline polyester main chain and at least one other component may also be referred to herein as a crystalline polyester if the amount of the other component is 50% by weight or less.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50° C. to about 90° C. The crystalline resins may have, for example, a number average molecular weight ($M_a$), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The weight average molecular weight ($M_w$) of the resin is 50,000 or less, for example, from about 2,000 to about 50,000, in embodiments from about 3,000 to about 40,000, in embodiments from about 10,000 to about 30,000 and in embodiments from about 21,000 to about 24,000, as determined by GPC using polystyrene standards. The molecular weight distribution ($M_w/M_n$) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g. The acid value (or neutralization number) is the mass of potassium hydroxide (KOH) in milligrams that is required to neutralize one gram of the crystalline polyester resin.

Illustrative examples of crystalline polyester resins may include any of the various crystalline polyesters, such as poly(ethylene-adipate), poly(propylene-adipate), polybutylene-adipate), poly(pentylene-adipate), poly(hexylene-adipate), poly(octylene-adipate), poly(ethylene-succinate), poly(propylene-succinate), poly(butylene-succinate), poly (pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly (pentylene-dodecanedioate), poly(hexylene-dodecanedioate), poly(octylene-dodecanedioate), poly (nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-furnarate), copoly (5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate) and combinations thereof.

The crystalline resin may be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and may be selected in an amount, for example, of from about 0.01 to about 1 mole percent of the resin. Additionally, in place of the organic diacid, an organic diester can also be selected, and where an alcohol byproduct is generated. In further embodiments, the crystalline polyester resin is a poly(dodecandioic-acid-co-nonanediol).

Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,13-tridecanediol, 1,14-tetradecanediol, 1,18-octadecanediol and 1,20-eicosanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfoaliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, pimelic acid, suberic acid, azelaic acid, sebacic acid, 1,9-nonanedicarboxylic acid, 1,10-decanedicarboxylic acid, 1,1-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbometh-oxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Suitable crystalline polyester resins include those disclosed in U.S. Pat. No. 7,329,476 and U.S. Patent Application Pub. Nos. 2006/0216626, 2008/0107990, 2008/0236446 and 2009/0047593, each of which is hereby incorporated by reference in their entirety. In embodiments, a suitable crystalline resin may include a resin composed of ethylene glycol or nonanediol and a mixture of dodecanedioic acid and fumaric acid co-monomers with the following formula (II):

(II)

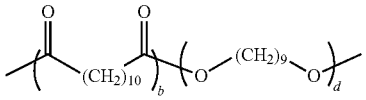

wherein b is from about 5 to about 2000 and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenyl-polyethoxyethyl methacrylate), poly(ethylene adipate), poly(decamethylene adipate), poly(decamethylene azelaate), poly(hexamethylene oxalate), poly(decamethylene oxalate), poly(ethylene oxide), polypropylene oxide), poly (butadiene oxide), poly(decamethylene oxide), poly(decamethylene sulfide), poly(decamethylene disulfide), poly(ethylene sebacate), poly(decamethylene sebacate), poly (ethylene suberate), poly(decamethylene succinate), poly (eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly (dimethyl siloxane), poly(dipropyl siloxane), poly (tetramethylene phenylene diacetate), poly(tetramethylene trithiodicarboxylate), poly(trimethylene dodecane dioate), poly(m-xylene), polyp-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight ($M_n$), as measured by gel permeation chromatography (GPC) of, for example, from about 1,000 to about 10,000, in embodiments from about 2,000 to about 9,000, in embodiments from about 3,000 to about 8,000, and in embodiments from about 6,000 to about 7,000. The weight average molecular weight ($M_w$) of the resin is greater than 55,000, for example, from about 55,000 to about 150,000, in embodiments from about 60,000 to about 100,000, in embodiments from about 63,000 to about 94,000, and in embodiments from about 68,000 to about 85,000, as determined by GPC using polystyrene standard. The polydispersity index (PD) is above about 4, such as, for example, greater than about 4, in embodiments from about 4 to about 20, in embodiments from about 5 to about 10, and in embodiments from about 6 to about 8, as measured by GPC versus standard polystyrene reference resins. (The PD index is the ratio of the weight-average molecular weight ($M_w$) and the number-average molecular weight ($M_n$).) The [low] *high* molecular weight amorphous polyester resins may have an acid value of from about 8 to about 20 mg KOH/g, in embodiments from about 9 to about 16 mg KOH/g, and in embodiments from about 11 to about 15 mg KOH/g. The high molecular weight amorphous polyester resins, which are available from a number of sources, can possess various melting points of, for example, from about 30° C. to about 140° C., in embodiments from about 75° C. to about 130° C., in embodiments from about 100° C. to about 125° C., and in embodiments from about 115° C. to about 121° C.

The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may prepared by branching or cross-linking linear polyester resins. Branching agents can be utilized, such as trifunctional or multifunctional monomers, which agents usually increase the molecular weight and polydispersity of the polyester. Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

Compositions containing modified polyester resins with a polybasic carboxylic acid which may be utilized in forming high molecular weight polyester resins include those disclosed in U.S. Pat. No. 3,681,106, as well as branched or cross-linked polyesters derived from polyvalent acids or alcohols as illustrated in U.S. Pat. Nos. 4,863,825; 4,863,824; 4,845,006; 5,143,809; 5,057,596; 4,988,794; 4,981,939; 4,980,448; 4,933,252; 4,931,370; 4,917,983 and 4,973,539, the disclosures of each of which are incorporated by reference herein in their entirety.

In embodiments, cross-linked polyesters resins may be made from linear amorphous polyester resins that contain sites of unsaturation that can react under free-radical conditions. Examples of such resins include those disclosed in U.S. Pat. Nos. 5,227,460; 5,376,494; 5,480,756; 5,500,324; 5,601,960; 5,629,121; 5,650,484; 5,750,909; 6,326,119; 6,358,657; 6,359,105; and 6,593,053, the disclosures of each of which are incorporated by reference in their entirety. In embodiments, suitable unsaturated polyester base resins may be prepared from diacids and/or anhydrides such as, for example, maleic anhydride, terephthalic acid, trimelltic acid, fumaric acid, and the like, and combinations thereof, and dials such as, for example, bisphenol-A ethyleneoxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Such polyester resins may be formed from at least two pre-gel compositions including at least one polyol having two or more hydroxyl groups or esters thereof, at least one aliphatic or aromatic polyfunctional acid or ester thereof, or a mixture thereof having at least three functional groups; and optionally at least one long chain aliphatic carboxylic acid or ester thereof, or aromatic monocarboxylic acid or ester thereof, or mixtures thereof. The two components may be reacted to substantial completion in separate reactors to produce, in a first reactor, a first composition including a pre-gel having carboxyl end groups, and in a second reactor, a second composition including a pre-gel having hydroxyl end groups. The two compositions may then be mixed to create a cross-linked branched polyester high molecular weight resin. Examples of such polyesters and methods for their synthesis include those disclosed in U.S. Pat. No. 6,592,913, the disclosure of which is hereby incorporated by reference in its entirety.

In embodiments, the cross-linked branched polyesters for the high molecular weight amorphous polyester resin may include those resulting from the reaction of dimethylterephthalate, 1,3-butanediol, 1,2-propanediol, and pentaerythritol.

Suitable polyols may contain from about 2 to about 100 carbon atoms and have at least two or more hydroxy groups, or esters thereof. Polyols may include glycerol, pentaerythritol, polyglycol, polyglycerol, and the like, or mixtures thereof. The polyol may include a glycerol. Suitable esters of glycerol include glycerol palmitate, glycerol sebacate, glycerol adipate, triacetin tripropionin, and the like. The polyol may be present in an amount of from about 20% to about 30% weight of the reaction mixture, in embodiments, from about 22% to about 26% weight of the reaction mixture.

Aliphatic polyfunctional acids having at least two functional groups may include saturated and unsaturated acids containing from about 2 to about 100 carbon atoms, or esters thereof, in some embodiments, from about 4 to about 20 carbon atoms. Other aliphatic polyfunctional acids include malonic, succinic, tartaric, malic, citric, fumaric, glutaric, adipic, pimelic, sebacic, suberic, azelaic, sebacic, and the like, or mixtures thereof. Other aliphatic polyfunctional acids which may be utilized include dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid.

Aromatic polyfunctional acids having at least two functional groups which may be utilized include terephthalic, isophthalic, trimellitic, pyromellitic and naphthalene 1,4-, 2,3-, and 2,6-dicarboxylic acids.

The aliphatic polyfunctional acid or aromatic polyfunctional acid may be present in an amount of from about 40% to about 65% weight of the reaction mixture, in embodiments, from about 44% to about 60% weight of the reaction mixture.

Long chain aliphatic carboxylic acids or aromatic monocarboxylic acids may include those containing from about 12 to about 26 carbon atoms, or esters thereof, in embodiments, from about 14 to about 18 carbon atoms. Long chain aliphatic carboxylic acids may be saturated or unsaturated. Suitable saturated long chain aliphatic carboxylic acids may include lauric, myristic, palmitic, stearic, arachidic, cerotic, and the like, or combinations thereof. Suitable unsaturated long chain aliphatic carboxylic acids may include dodecylenic, palmitoleic, oleic, linoleic, linolenic, erucic, and the like, or combinations thereof. Aromatic monocarboxylic acids may include benzoic, naphthoic, and substituted naphthoic acids. Suitable substituted naphthoic acids may include naphthoic acids substituted with linear or branched alkyl groups containing from about 1 to about 6 carbon atoms such as 1-methyl-2 naphthoic acid and/or 2-isopropyl-1-naphthoic acid. The long chain aliphatic carboxylic acid or aromatic monocarboxylic acids may be present in an amount of from about 0% to about 70% weight of the reaction mixture, in embodiments, of from about 15% to about 30% weight of the reaction mixture.

Additional polyols, ionic species, oligomers, or derivatives thereof, may be used if desired. These additional glycols or polyols may be present in amounts of from about 0% to about 50% weight percent of the reaction mixture. Additional polyols or their derivatives thereof may include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate iso-butyrate and the like.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in the core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8. In embodiments, at least one polyester resin may comprise at least one amorphous polyester resin, optionally in combination with at least one crystalline polyester resin. In embodiments, toners may comprise at least one amorphous resin in combination with at least one crystalline resin Surfactants In embodiments, resins, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2 A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Toner

The resin of the resin emulsions described above, in embodiments a polyester resin, may be utilized to form toner compositions. Such toner compositions may include optional colorants, optional waxes, and other additives. Toners may be formed utilizing any method within the purview of those skilled in the art including, but not limited to, emulsion aggregation methods.

Colorants

The latex particles produced as described above may be added to a colorant to produce a toner. In embodiments the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

In embodiments, toners of the present disclosure may have high pigment loadings. As used herein, high pigment loadings include, for example, toners having a colorant in an amount of from about 7 percent by weight of the toner to about 40 percent by weight of the toner, in embodiments from about 10 percent by weight of the toner to about 18 percent by weight of the toner. These high pigment loadings are important to achieve fully saturated colors with high chroma, and particularily to enable a good color match to certain colors such as PANTONE® Orange, Process Blue, PANTONE® yellow, and the like. (The PANTONE® colors refer to one of the most popular color guides illustrating different colors, wherein each color is associated with a specific formulation of colorants, and is published by PANTONE, Inc., of Moonachie, N.J.) One issue with high pigment loading is that it may reduce the ability of the toner particles to spherodize, that is, become circular, during the coalescence step, even at a very low pH.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 μm to about 10 μm in volume average diameter, and in embodiments of from about 5 μm to about 8 μm in volume average diameter.

Wax

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190$^{TH}$, POLYFLUO 200™, POLYSILK 19$^{TH}$, POLYSILK 14™ available from Micro Powder Inc., mixed fluorinated, amide waxes, for example MICROSPERSION 19$^{TH}$ also available from Micro Powder Inc., imides, esters, quaternary amines, carboxylic acids or acrylic polymer emulsion, for example JONCRYL 74™ 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

Toner Preparation

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes. The addition of the agent may also be done while the mixture is maintained under stirred conditions, in embodiments from about 50 rpm to about 1,000 rpm, in other embodiments from about 100 rpm to about 500 rpm, and at a temperature that is below the glass transition temperature of the resin as discussed above, in embodiments from about 30° C. to about 90° C., in embodiments from about 35° C. to about 70° C.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a COULTER COUNTER, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Shell Resin

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example free radical or thermal initiators such as organic peroxides and azo compounds described above as suitable for forming a gel in the core. Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy) hexane, t-butyl cumyl peroxide, α-α-bis (t-butyl peroxy) diisopropyl benzene, di-t-butyl peroxide and 2,5-dimethyl 2,5di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy) cyclohexane, 1,1-di (t-amyl peroxy) cyclohexane, 2,2-di (t-butyl peroxy) butane, ethyl 3,3-di(t-butyl peroxy) butyrate and ethyl 3,3-di (t-amyl peroxy) butyrate, and combinations thereof. Examples of suitable azo compounds include 2,2,'-azobis(2,4-dimethylpentane nitrile), azobis-isobutyronitrile, 2,2'-azobis(isobutyronitrile), 2,2'-azobis(2,4-dimethyl valeronitrile), 2,2'-azobis (methyl butyronitrile), 1,1'-azobis (cyan cyclohexane), other similar known compounds, and combinations thereof.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time of from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

A single polyester resin may be utilized as the shell or, as noted above, in embodiments a first polyester resin may be combined with other resins to form a shell. Multiple resins may be utilized in any suitable amounts. In embodiments, a first amorphous polyester resin, for example a low molecular weight amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments a second resin, in embodiments a high molecular weight amorphous resin, may be present in the shell resin in an amount of from about 0 percent by weight to about 80 percent by weight of the total shell resin, in embodiments from about 10 percent by weight to about 70 percent by weight of the shell resin.

Coalescence

The mixture of latex, colorant, optional wax, and any additives, is subsequently coalesced. Coalescing may include stirring and heating at a temperature of from about 80° C. to about 99° C., for a period of from about 0.5 to about 12 hours, and in embodiments from about 1 to about 6 hours. Coalescing may be accelerated by additional stirring.

As noted above, one issue with high pigment loading for toners of the present disclosure is that it may reduce the ability of the toner to spherodize during the coalescence step, even at a very low pH. Thus, in embodiments, a transition metal powder and/or a transition metal salt may be added to the mixture of latex, colorant, optional wax, and any additives, at the beginning of the coalescence process. Suitable metals include, for example, copper, zinc, iron, cobalt, nickel, molybdenum, manganese, chromium, vanadium, and/or titanium, as well as metal alloys such as copper/zinc alloys.

In other embodiments, elemental copper or copper salts, iron or iron salts, or combinations thereof, may be utilized to speed coalescence and obtain desired particle circularity for a toner of the present disclosure. Examples of such copper and/or iron salts include nitrates, sulfates, halides, acetates, phosphates, oxides, hydroxides, carbonates, combinations thereof, and the like. In embodiments, the salt may be insoluble. The degree of solubility may be, for example:

nitrates—soluble
sulfates—soluble
halides—soluble
acetates—soluble
phosphates—insoluble
oxides—insoluble
hydroxides—insoluble
carbonates—insoluble In embodiments, a copper nitrate, such as copper II nitrate, may be utilized as the metal salt. In other embodiments, an iron salt such as iron nitrate may be utilized as the metal salt.

The amount of metal powder added to the mixture may be from about 0.01 weight percent to about 4 weight percent, in embodiments from about 0.09 to about 1 weight percent. The amount of metal salt added to the mixture may be from about 0.01 weight percent to about 4 weight percent, in embodiments from about 0.09 to about 1 weight percent.

The use of the transition metal powder and/or transition metal salt enables rapid coalescence of highly pigmented polyester toners. Coalescence may occur over a period of time of from about 0.1 hours to about 10 hours, in embodiments from about 0.5 hours to about 3.5 hours.

Surprisingly, the presence of the transition metal powder and/or transition metal salt may facilitate fast toner coalescence to achieve a circularity of greater than about 0.95. Without this improved process, the toner circularity achieved in a highly pigmented EA toner may be less than about 0.94. The addition of the insoluble transition metal powder and/or the addition of the metal salt imparts no detrimental properties to the toner particles. In fact, very little of the metal remains in the final toner.

Moreover, a highly pigmented toner of the present disclosure may possess increased levels of pigment. For example, whereas a conventional magenta toner may contain about 4.5% PR122 and 4.5% PR269, a highly pigmented toner of the present disclosure may contain about 6.525% of each pigment, for a total pigment loading of about 13.055 by weight.

Subsequent Treatments

In embodiments, after coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time of from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

The toner slurry may then be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

The toner of the present disclosure may possess particles having a volume average diameter (also referred to as "volume average particle diameter") of from about 2 to about 7 microns, in embodiments from about 3 to about 7 microns, in embodiments from about 4 to about 6 microns, in embodiments about 5.8 microns. As noted above, the resulting toner particles may have a circularity greater than about 0.95, in embodiments from about 0.95 to about 0.998, in embodiments of from about 0.955 to about 0.97. When the spherical toner particles have a circularity in this range, the spherical toner particles remaining on the surface of the image holding member pass between the contacting portions of the imaging holding member and the contact charger, the amount of deformed toner is small, and therefore generation of toner filming can be prevented so that a stable image quality without defects can be obtained over a long period.

Additives

In embodiments, the toner particles may also contain other optional additives, as desired or required. For example, the toner may include positive or negative charge control agents, for example in an amount of from about 0.1 to about 10 percent by weight of the toner, in embodiments from about 1 to about 3 percent by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Hodogaya Chemical); combinations thereof, and the like. Such charge control agents may be applied simultaneously with the shell resin described above or after application of the shell resin.

There can also be blended with the toner particles external additive particles including flow aid additives, which additives may be present on the surface of the toner particles. Examples of these additives include metal oxides such as titanium oxide, silicon oxide, tin oxide, mixtures thereof, and the like; colloidal and amorphous silicas, such as AEROSIL®, metal salts and metal salts of fatty acids inclusive of zinc stearate, aluminum oxides, cerium oxides, and mixtures thereof. Each of these external additives may be present in an amount of from about 0.1 percent by weight to about 5 percent by weight of the toner, in embodiments of from about 0.25 percent by weight to about 3 percent by weight of the toner. Suitable additives include those disclosed in U.S. Pat. Nos. 3,590,000, 3,800,588, and 6,214,507, the disclosures of each of which are hereby incorporated by reference in their entirety. Again, these additives may be applied simultaneously with a shell resin described above or after application of the shell resin.

In embodiments, toners of the present disclosure may be utilized as ultra low melt (ULM) toners. In embodiments, the dry toner particles, exclusive of external surface additives, may have the following characteristics:

(1) Number Average Geometric Standard Deviation (GSDn) and/or Volume Average Geometric Standard Deviation (GSDv) of from about 1.05 to about 1.55, in embodiments from about 1.1 to about 1.4.

(2) Glass transition temperature of from about 40° C. to about 65° C., in embodiments from about 50° C. to about 62° C.

The characteristics of the toner particles may be determined by any suitable technique and apparatus. Volume average particle diameter Dsov, GSDv, and GSDn may be measured by means of a measuring instrument such as a Beckman Coulter MULTISIZER™ 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter MULTISIZER™ 3. Toners produced in accordance with the present disclosure may possess excellent charging characteristics when exposed to extreme relative humidity (RH) conditions. The low-humidity zone (C zone) may be about 10° C./15% RH, while the high humidity zone (A zone) may be about 28° C./85% RH. Toners of the present disclosure may also possess a parent toner charge per mass ratio (Q/m) of from about −3 μC/gramto about −90μC/gram, in embodiments from about −10 μC/gram to about −80 μC/gram, and a final toner charging after surface additive blending of from −10 μC/gram to about −70μC/gram, in embodiments from about −15 μC/gram to about −60 μC/gram.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 μm in size, in embodiments from about 50 to about 75 μm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrostatographic or electrophotographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

In embodiments, an electrophotographic printing apparatus which may be utilized to form images with toners of the present disclosure may incorporate semiconductive magnetic brush development (SCMB). Such printing apparatus are within the purview of those skilled in the art and include, in embodiments, those disclosed in U.S. Pat. No. 7,546,069, the disclosure of which is incorporated by reference herein in its entirety.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 160° C. or less, in embodiments from about 70° C. to about 160° C., in other embodiments from about 80° C. to about 140° C.

Utilizing the methods of the present disclosure, highly pigmented toners may be produced which require less toner to obtain the same image. These highly pigmented toners may exhibit an increase in pigment loading of about 33 to about 100% higher than nominal. Reducing the toner mass per unit area (TMA) on the print results in a thinner toner layer. To compensate for the reduced TMA, and still get the correct optical density, the loading of pigment in the toner should be increased inversely proportionally to the TMA, so that the total amount of pigment in the image layer is the same. This reduces the toner run cost proportionally to the TMA reduction. The thinner toner layers also result in more of an offset look and feel for the print, as offset inks produce thin image layers on the print.

Thus, as depicted in FIG. 1, as compared with a conventional toner, and a highly pigmented toner of smaller particle size, a toner of the present disclosure may be highly pigmented and of a larger size, but may still provide a toner layer of desirable, lower, thickness and TMA.

For example, a toner of the present disclosure, having an average toner diameter of about 5.8 μm, may be used to produce a solid area patch monolayer color toner having a thickness of about 5.5 μm. Reducing the toner size to about 4 μm diameter, produces a 4.2 μm solid area patch monolayer color thickness, a reduction of about 30% in layer thickness compared to the larger toner. To match optical density, the pigment loading must increase by about 45%. However, a 4 μm toner reduces developer latitude substantially: desired image density can only be reached in C-zone at a toner concentration (TC) of about 12% or more. Latitude in A-zone is also reduced, though still manageable due to the lower charge.

This suggests that development latitude could be maintained with smaller toner if the pigment loading was increased to reduce the TMA beyond that normally observed. Thus, in the past with smaller size toner, the toner layer was still similar in thickness to the toner diameter. In accordance with the present disclosure, the small toner would produce a toner layer on the print that is thinner than the reduced particle size diameter, and thus a smaller toner that is hyper-pigmented. The reduced latitude from the small toner size could be offset by the enhanced TMA reduction.

Another option for toner, and specifically for emulsion aggregation (EA), and EA ultra low melt (ULM) toners that are already relatively small in size, and thus would suffer most with smaller toner size, is not to reduce the toner size, but still reduce the amount of toner developed onto the image. If the toner particles are kept the same size, but the TMA is reduced, this means the developed initially unfused toner particles will not completely cover the substrate even in a full solid area patch. On fusing, the EA ULM flows well to fill in the image, to produce excellent solid area patches, even on rough paper. In other words, the toner particles applied to the substrate may form an incomplete layer prior to fusing, and then form a complete monolayer after fusing. To assist in compensating for the reduced TMA, and still get the correct optical density, the loading of pigment in the toner may also be increased proportionally to the TMA reduction, so that the total amount of pigment in the image layer is the same. In embodiments, the result is a toner with a diameter greater than 5 μm that provides a toner layer thickness less than 5 μm. As noted below in the Examples, a 30% lower TMA reduction may be demonstrated with a 5.9 μm EA ULM toner with this approach, increasing pigment loading by 45%.

The present disclosure thus proposes a printing process and toner where the final toner layer thickness of a single color 100% solid area image layer on the print is significantly thinner than the toner particle diameter, enabling layer thicknesses of less than about 5 μm from toner particles that are larger than 5 μm in diameter.

Toner particles may thus have a volume diameter of from about 2 μm to about 7 μm, in embodiments from about 3 to about 6 μm. In other embodiments, toner particles may have a volume diameter of from about 3.5 μm to about 5 μm, in embodiments from about 4 μm to about 4.5 μm.

After fusing the toner particles on the substrate form an image. The resulting 100% solid area image for a single color may have a thickness of from about 1 μm to about 5 μm, in embodiments from about 2 μm to about 4 μm.

Thus, in accordance with the present disclosure, the image for 100% solid area single color may have a thickness less than about 70% of the diameter of the toner particles used to form the image, in embodiments the image thickness may be from about 30% to about 65% of the diameter of the toner particles used to form the image, in embodiments from about 40% to about 60% of the diameter of the toner particles used to form the image. Put another way, in embodiments, the ratio of the single color solid area layer thickness after fusing to the layer thickness before fusing, is less than 0.65, in embodiments from about 0.30 to about 0.65, in embodiments from about 0.40 to about 0.55.

In embodiments it is desirable to achieve acceptable print density in combination with acceptable image mottle performance. An expert evaluation is used to determine when acceptable mottle is achieved and then related to reflection Optical Density (O.D.), which is dependent on image gloss and saturation at higher densities. For engineering purposes, the reflection O.D. of a fused print is measured and related to when an acceptable image quality is reached. At the present time, acceptable image quality is reached with a reflection O.D. of at least about 1.6, which may be dependent on the substrate and image quality, among other factors. In accordance with the present disclosure, the 100% single layer optical density of a toner may be from about 1.6 to about 2.3, in embodiments from about 1.7 to about 2.2.

In embodiments, the ratio of toner mass per unit area (found with an image on a substrate) to the volume diameter of the toner particles may be from about 0.050 $mg/cm^2/\mu m$ to about 0.075 $mg/cm^2/\mu m$, in embodiments from about 0.055 $mg/cm^2/\mu m$ to about 0.070 $mg/cm^2/\mu m$.

In embodiments, the processes of the present disclosure may be utilized to form monochrome images, i.e., where a single color is printed. In other embodiments, the processes of the present disclosure may include printing multiple colors, in embodiments from about 2 to about 8 colors, in other embodiments from about 3 to about 6 colors.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Comparative Example 1

A cyan toner, having about 5.5% cyan pigment, with particles of about 5.8 μm in size (sometimes referred to as 5.8 μm with nominal pigment loading), was prepared as follows. In a 3 liter reactor vessel, the following components were combined: about 196 grams of an amorphous polyester resin in an emulsion (polyester emulsion A), having a weight average molecular weight (Mw) of about 86,000, a number average molecular weight (Mn) of about 5,600, an onset glass transition temperature (Tg onset) of about 56° C., and about 35% solids; about 194 grams of an amorphous polyester resin in an emulsion (polyester emulsion B), having a Mw of about 19,400, an Mn of about 5,000, and a Tg onset of about 60° C., and about 35% solids; about 57 grams of a crystalline polyester resin in an emulsion, having a Mw of about 23,300, an Mn of about 10,500, a melting temperature (Tm) of about 71° C., and about 35.4% solids; about 95.2 grams of cyan pigment, Pigment Blue 15:3 (PB15:3) (about 17% solids); about 83 grams of polyethylene wax in an emulsion, having a Tm of about 90° C., and about 30% solids; about 33 grams of 0.3 molar $HNO_3$; and about 962 grams of deionized water.

Both amorphous resins were of the following formula:

(I)

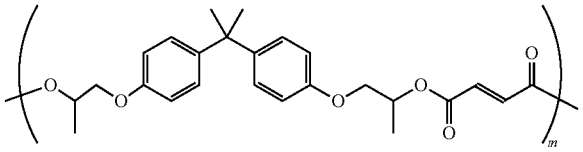

wherein m was from about 5 to about 1000.

The crystalline resin was of the following formula:

(II)

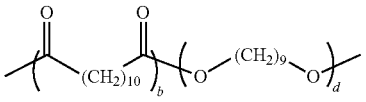

wherein b was from about 5 to about 2000 and d was from about 5 to about 2000. The mixture was stirred using an IKA Ultra TURRAX®T50 homogenizer operating at about 4,000 revolutions per minute (rpm).

Thereafter, about 134.4 grams of a flocculent mixture containing about 1.35 grams aluminum sulfate and about 133.05 grams of deionized water was added dropwise over a period of about 5 minutes. As the flocculent mixture was added drop-wise, the homogenizer speed was increased to about 5,200 rpm and homogenized for an additional 5 minutes. Thereafter, the mixture was stirred at about 480 rpm and heated at a 1° C. per minute temperature increase to a temperature of about 47° C. and held there for a period of from about 1.5 hours to about 2 hours resulting in particles having a volume average particle diameter of about 5 μm as measured with a COULTER COUNTER.

An additional 108 grams of polyester emulsion A and 107 grams of polyester emulsion B were added to the reactor mixture and allowed to aggregate for an additional period of about 30 minutes, resulting in particles having a volume average particle diameter of about 5.8 μm. The pH of the reactor mixture was adjusted to about 5 with a 1 molar sodium hydroxide solution, followed by the addition of about 10.385 grams of VERSENE 100 (an ethylene diamine tetraacetic acid (EDTA) chelating agent). The pH of the reactor mixture was then adjusted to about 7.5 with a 1 molar sodium hydroxide solution, and the stirring reduced to about 170 rpm. The reactor mixture was then heated at a temperature increase of about 1° C. per minute to a temperature of about 85° C.

The pH of the mixture was then adjusted to about 6.8 with a sodium acetate buffer solution. The reactor mixture was then gently stirred at about 85° C. for about 2.5 hours to coalesce and spherodize the particles. The reactor heater was then turned off and the mixture was poured into a container with deionized ice cubes. The toner of this mixture had a volume average particle diameter of about 5.8 μm, a geometric size distribution (GSD) of about 1.20, and a circularity of about 0.980. The particles were washed 3 times with deionized water at room temperature and then freeze-dried.

Example 1

A cyan toner, having about 7.98% cyan pigment, with particles of about 5.9 μm in size, was prepared as per the process described above in Comparative Example 1, with the following modifications. (This toner may be referred to, in embodiments, as hyper-pigmented 5.9 μm toner.) About 187 grams of polyester emulsion A was combined with about 185 grams of polyester emulsion B, about 57 grams of the crystalline polyester emulsion from Comparative Example 1, about 138 grams of PB15:3, about 83 grams of the polyethylene wax emulsion from Comparative Example 1, about 33 grams of 0.3 molar $HNO_3$, and about 962 grams of deionized water. As in Comparative Example 1, the mixture was stirred with an homogenizer operating at about 4,000 rpm.

The same flocculent mixture of Comparative Example 1, containing about 1.35 grams aluminum sulfate and about 133.05 grams of deionized water, was added dropwise over a period of about 5 minutes. As the flocculent mixture was added drop-wise, the homogenizer speed was increased to 5,200 rpm and homogenized for an additional 5 minutes. Thereafter, the mixture was stirred at about 480 rpm and heated at a 1° C. per minute temperature increase to a temperature of about 47° C. and held there for a period of from about 1.5 hours to about 2 hours, resulting in particles having a volume average particle diameter of about 5 μm as measured with a COULTER COUNTER.

An additional 108 grams polyester emulsion A and 107 grams of polyester emulsion B were added to the reactor mixture and allowed to aggregate for an additional period of about 30 minutes resulting in a volume average particle diameter of about 5.9 μm. The pH of the reactor mixture was adjusted to about 5 with about 1 molar sodium hydroxide solution, followed by the addition of about 10.385 grams of VERSENE 100. The pH of the reactor mixture was then adjusted to about 7.5 with a 1 molar sodium hydroxide solution, and the stirring reduced to 170 rpm. The reactor mixture was then heated at a temperature increase of about 1° C. per minute to a temperature of about 85° C. The pH of the mixture was then adjusted to about 6.8 with a sodium acetate buffer solution. The reactor mixture was then gently stirred at about 85° C. for about 2.5 hours to coalesce and spherodize the particles. The reactor heater was then turned off and the mixture was poured into a container with deionized ice cubes.

The toner of this mixture had a volume average particle diameter of about 5.9 μm, a GSD of about 1.20, and a circularity of about 0.980. The particles were washed 3 times with deionized water at room temperature and then freeze-dried.

Comparative Example 2

A cyan toner, having about 7.98% cyan pigment, with particles of about 4 μm in size, was prepared as per the process described above in Example 1, with the following modifications. (This toner may be referred to, in embodiments, as a highly pigmented 4 μm toner.)

After the dropwise addition of the flocculent mixture as described above in Example 1, with the homogenizer speed increased to about 5,200 rpm homogenized for 5 minutes, the mixture was stirred at about 620 rpm and held at a temperature of about 28° C. for a period of about 1.5 hours to about 2 hours. The resulting particles had a volume average particle diameter of about 3.5 μm as measured with a COULTER COUNTER.

The same amounts of polyester emulsions A and B as described in Example 1 were then added to the particles, followed by additional aggregation for about 30 minutes resulting in particles having a volume average particle diameter of about 4.01 μm.

After coalescing and spherodizing the particles as in Example 1 above, the reactor heater was turned off and the mixture was poured into a container with deionized ice cubes. The toner particles of this mixture had a volume average particle diameter of about 4.0 μm, a GSD of about 1.22, and a circularity of about 0.980. The particles were washed 3 times with deionized water at room temperature and then freeze-dried.

Toner SEM

Scanning electron micrograph (SEM) images were obtained of the toners of Comparative Example 1, Example 1, and Example 2 with a 6300F SEM, commercially available from JEOL. All toners were very smooth and spherical, with no evidence of surface pigment.

Preparation of Developer

All toners were blended in a 4 liter HENSCHEL MDCBR for about 10 minutes at about 4200 rpm. The additive package utilized was as follows:

about 0.88% of titanium dioxide treated with a decylsilane, commercially available as JMT2000 from Tayca;

about 1.71% of a silica surface treated with polydimethylsiloxane, commercially available as RY50 from Evonik (from Nippon Aerosil);

about 1.73% of a sol-gel silica surface treated with hexamethyldisilazane, commercially available as X24-9163A from Nisshin Chemical Kogyo;

about 0.55% of a cerium dioxide, commercially available as E1 0 from Mitsui Mining & Smelting; and about 0.2% of zinc stearate.

For the 4 μm toner of Example 2, all additive loadings were increased due to the smaller size of the particles in order to maintain the same surface area coverage. The additive loadings for the 4 μm toner of Example 2 were:

about 1.28% of titanium dioxide treated with a decylsilane, commercially available as JMT2000 from Tayca;

about 2.48% of a silica surface treated with polydimethylsiloxane, commercially available as RY50 from Evonik (from Nippon Aerosil);

about 2.51% of a sol-gel silica surface treated with hexamethyldisilazane, commercially available as X24-9163A from Nisshin Chemical Kogyo;

about 0.8% of a cerium dioxide, commercially available as E10 from Mitsui Mining & Smelting; and about 0.29% of zinc stearate.

The developer was prepared with XEROX® 700 carrier at 8% toner concentration. Toners and carriers were weighed out to a total of about 450 grams of developer in a 1 liter glass jar, followed by conditioning in A-zone overnight. The glass jar was sealed and mixed for 10 minutes on a TURBULA® mixer. This developer was then filled in an empty XEROX® DC250 developer housing for the machine test.

Bench Charging

Developers were prepared by adding 0.5 grams toner to 10 grams of XEROX® 700 carrier. A duplicate developer sample pair was prepared for each toner evaluated. One developer of the pair was conditioned overnight in A-zone (28° C./85% RH), and the other was conditioned overnight in the C-zone (10° C./15% RH). The next day, the developer samples were sealed and agitated for about 2 minutes and then for about 1 hour using a TURBULA® mixer. After mixing, the triboelectric charge of the toner was measured using a charge spectrograph with a 100 V/cm field. The toner charge (q/d) was measured visually as the midpoint of the toner charge distribution. The charge was reported in millimeters of displacement from the zero line (mm displacement can be converted to femtocoulombs/micron (fC/μm) by multiplying by 0.092).

Following about 1 hour of mixing, an additional 0.5 grams of toner was added to the already charged developer, and mixed for an additional 15 seconds, where a q/d displacement was again measured, and then mixed for an additional 45 seconds (total 1 minute of mixing), and again a q/d displacement was measured. This measures the toner admix.

The Q/M was also measured by the total blow-off method, which is in the purview of those skilled in the art. Only a 60 minute charge is reported in FIG. 2. Similar trends were seen in the 2 minute charge data and admix.

FIG. 2 shows that varying the size of the cyan toner from 5.8 ρm to 4 μm (with a corresponding increase in pigment loading) dramatically increased Q/M and decreased Q/D. The Q/M to Q/D ratio was increased from 4 to 5 at 5.8 μm, to from 8 to 11 at 4 μm, which was about a 2-fold increased ratio. Since development decreases with Q/M and background increases with lower Q/D, this is a huge loss of development to background latitude.

For toners of the present disclosure, where toner size was 5.9 μm (Example 1) but pigment loading increased (as it did in the 4 μm (Comparative Example 2) toner, from 5.5% to nearly 8% cyan pigment), Q/M was not affected and Q/D increased only marginally (<15%). Since the effect of pigment was passivated, there was essentially no loss in development-background latitude due to Q/M and Q/D changes.

Print Testing

Prints were made on a XEROX® DC250 printer in A-zone and C-zone on CX+ uncoated or DCEG coated papers, both commercially available from XEROX® Corporation. Data in the printer was collected at an initial 8% toner concentration (TC), and then more toner was added to the developer housing to increase to 12% TC. For each zone and TC, two sets of prints (one for each paper type) were made by varying the laser diode power (LD), which varied the development voltage. The test pattern had 20 square patches for optical density (OD) measurement. The average OD value of these 20 patches was the reported OD for that development voltage setting. Optical density was measured with a 504 Densitometer made by X-Rite, and for each color the appropriate channel setting for that color was chosen. Settings for OD measurement were: Density Opt=A, Precision=High, Gray Set=Standard, Channel=C for cyan toner. For measurement of other colors such as black, magenta and yellow, the appropriate color channel would be used, Channel=V for black toner, Channel=M for magenta toner and Channel=Y For yellow toner.

The development voltages required to meet the target optical density (between 1.6 and 1.8) were found by fitting a curve of OD vs. development voltage. Image quality (IQ) prints and prints for OD measurement, were generated at each set point. TMA and developer mass per unit area (DMA) were measured and the transfer efficiency was calculated. Background was measured by a tape transfer off the photoreceptor at various cleaning voltages at the LD setting corresponding to OD=1.6 on DCEG substrate, and compared to a standard visual reference.

Figure 3A:
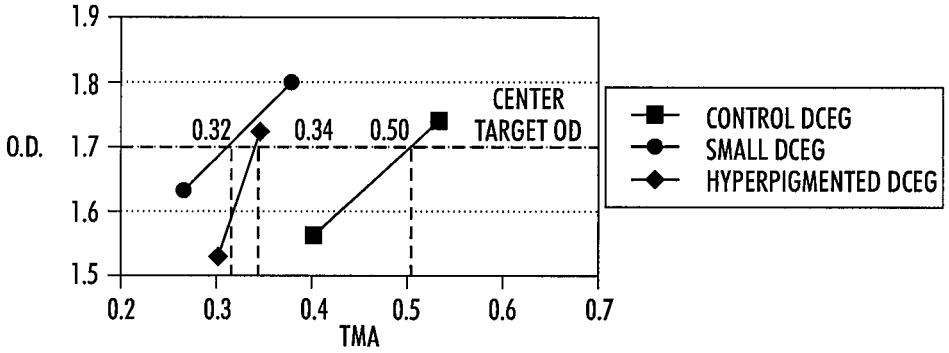
FIGS. 3A and 3B are graphs depicting optical density of toners of the present disclosure compared with comparative toners on CX+ and DCEG papers as a function of toner mass per unit area (TMA)
Figure 3B:
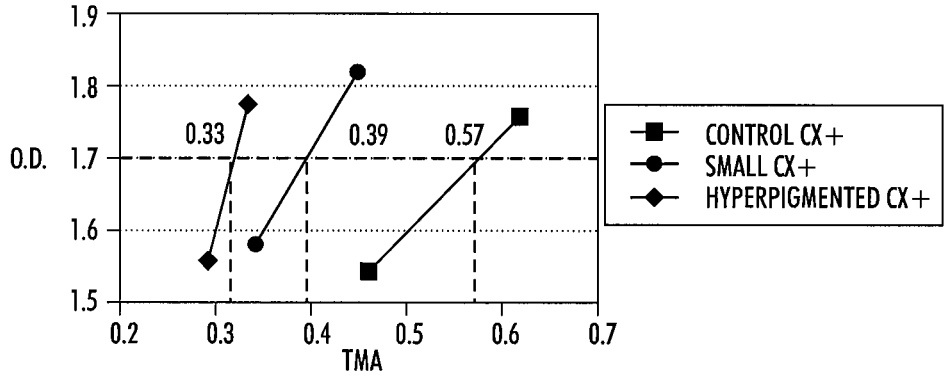
Figure 4A:
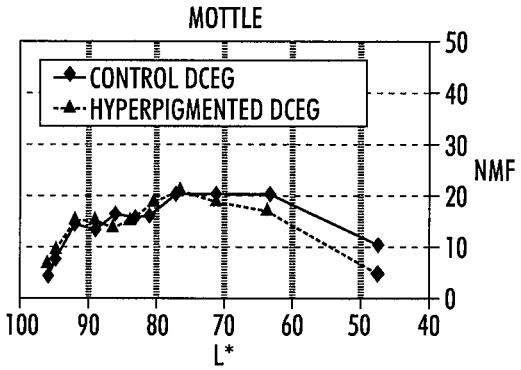
FIGS. 4A-D are graphs depicting image quality for toners of the present disclosure compared with comparative toners for mottle (FIG. 4A), graininess (FIG. 4B), mottle as a function of graininess (FIG. 4C), and line width and line density (FIG. 4D)
Figure 4B:
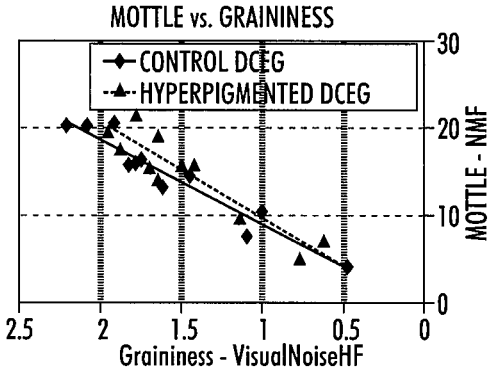
Figure 4C:
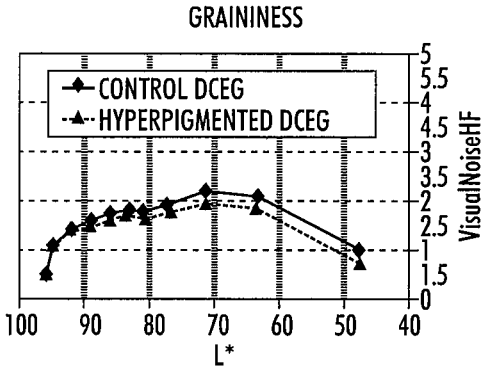
Figure 4D:
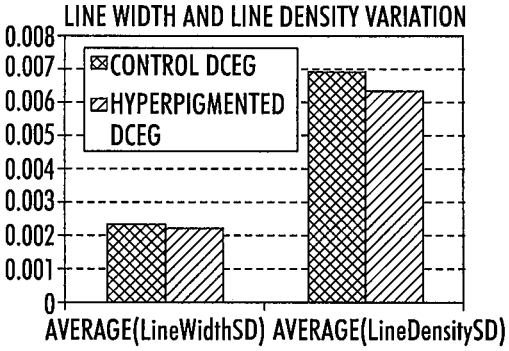

After the background measurement, additional unfused prints were generated for fusing studies. The results are set forth in FIGS. 3A and 3B. As can be seen in FIGS. 3A and 3B, both the highly pigmented 4 μm toner of Comparative Example 2 and the hyper-pigmented 5.9 μm toner of Example 1 achieved the central target optical density of 1.7 at much lower TMA than the toner of Comparative Example 1, which was 5.8 μm in size with nominal pigment loading. In fact, on rougher uncoated CX+ paper, the nominal 5.8 μm toner of Comparative Example 1 and 4 μm toner of Comparative Example 2 required substantially more toner to cover the paper than for the same toners on the smoother coated DCEG paper.

On the other hand, the hyper-pigmented 5.9 μm toner of Example 1 did not require more toner on rougher paper, showing superior toner coverage. The reduction of TMA was close to the theoretical based on the pigment ratio, a 31% reduction to 69% of the toner required, but with the hyper-pigmented 5.9 μm toner of the present disclosure, the coverage of the paper on uncoated papers was better than expected.

The above data demonstrates the ability of a toner of the present disclosure to cover paper with a 30% TMA reduction. Also, for the usual printing process with a conventional 5.8 μm sized toner of Comparative Example 1, the ratio of the TMA to particle size was 0.086 $mg/cm^2/\mu m$ on DCEG, and higher at 0.098 on rougher paper. For the 4.0 μm toner of Comparative Example 2, the ratio of the TMA to particle size was 0.08 $mg/cm^2/\mu m$ on DCEG, and higher at 0.098 on rougher paper. For the toner of Example 1, the ratio of TMA to particle size was 0.056 on DCEG and 0.058 on CX+. Thus, the toners of the present disclosure had a much lower TMA to particle size ratio than the usual printing process.

Halftone dot structure and toner scatter, line formation and solid area fill for both negative and positive lines were reviewed for the above toners. Visually and microscopically, image quality was similar for the nominal 5.8 μm toner of Comparative Example 1 and hyper-pigmented 5.9 μm toners of Example 1 on both CX+ and DCEG paper. Also, visually halftone toner reproduction curves (TRC) and patch legibility, the lowest coverage half-tone patch that is visually perceptible of both toners was very similar, with patch visibility down to 5% patches.

Mottle and graininess were determined for the 5.9 μm 7.97% hyper-pigmented toner of the present disclosure, and the nominal 5.8 μm of Comparative Example 1 toner having 5.5% pigment loading on DCEG paper.

The results are set forth in FIGS. 4A-4D. As can be seen from the figures, mottle and graininess were very similar for both the hyper-pigmented toner of Example 1 and the control toner of Comparative Example 1. Indeed, at equivalent L*, the toner of Example 1 had a little better mottle for L*, less than 70, and a little better graininess for L*, less than about 80. Both toners showed a similar correlation of mottle to graininess. Average line width and line density variation were also similar.

Thus, imaging process and the hyper-pigmented toner of the present disclosure did not degrade image quality, indeed for lower L* the mottle and graininess were slightly improved.

Fusing

Additional micrographs of toner prints for the above toners were obtained. The micrographs showed that the 5.9 μm hyper-pigmented, unfused toner of Example 1 was a sub-monolayer in a solid area 100% patch, while the small 4 μm toner of Example 2 and nominal 5.8 μm toner of Comparative Example 1 were approximately monolayers, with also some toner sitting on top of other toner in a second layer (which was more obvious under the microscope by moving up and down in focus). On fusing, the 5.9 μm hyper-pigmented, unfused toner of Example 1 spread out and flowed to fill the gaps to provide a final toner image with excellent paper covering power, giving the required optimal density at lower TMA. In flowing and filling out the image, there was no indication of a degradation of image quality.

It was observed that the 5.9 μm hyper-pigmented toner of Example 1 and the nominal 5.8 μm control toner of Comparative Example 1 produced very similar 25% AC half-tone dots after fusing. The hyper-pigmented dots were similar in size and shape for both toners. The above thus demonstrated the ability of a 5.9 μm hyper-pigmented toner of the present disclosure to fill in the toner image solid areas.

Development

Figure 5:
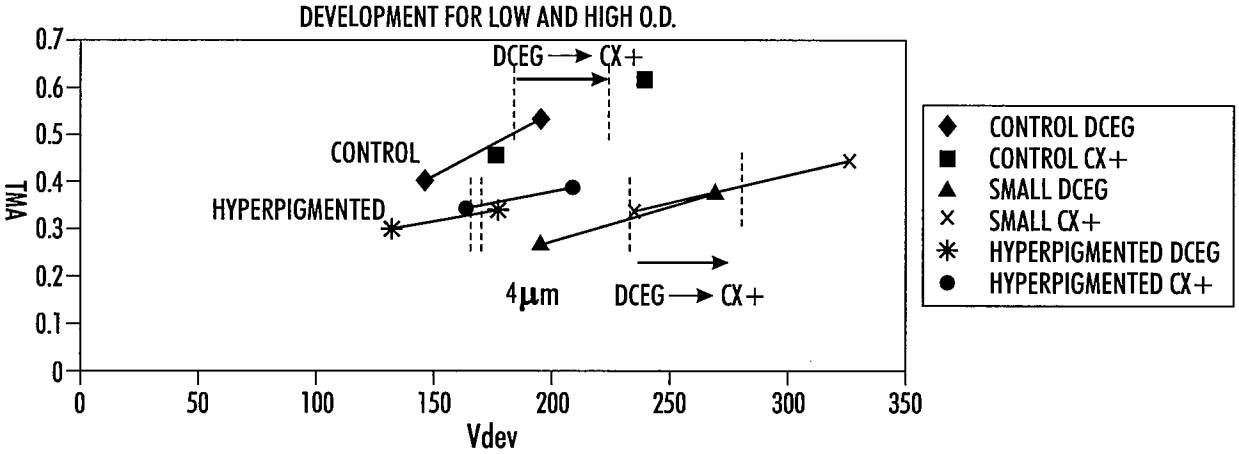
FIG. 5 is a graph depicting development (optical density (O.D.)) curves for toners of the present disclosure compared with comparative toners on CX+ and DCEG papers.

Development curves were obtained for the three toners in A-zone at 8% TC. The results are set forth in FIG. 5, which shows development curves for toners on DCEG and CX+ paper (OD targets for each toner are depicted with vertical dotted lines). Because of the A-zone environment, charge (Q/M) was reasonable for all toners, including the 4 μm toner of Example 2. All were below 50 μC/g. On DCEG paper, the control 5.8 μm toner of Comparative Example 1 developed to the required TMA at 180 volts. Due to the lower TMA requirement, the hyper-pigmented 5.9 μm toner of Example 1 required a lower voltage of about 160 volts. Due to the small size and high charge, the 4 μm toner of Comparative Example 2 required nearly 240 volts development potential. On rougher CX+ paper the trends were the same, but the advantage for the hyper-pigmented 5.9 μm toner of Example 1 was even greater, 165 volts compared with 230 volts for the 5.8 μm toner of Comparative Example 1, compared with 280 volts for the 4 μm sized toner of Comparative Example 2.

The hyper-pigmented toners of the present disclosure thus enabled reduced TMA without particle size reduction, and had a development latitude advantage compared to the control. Small toners with high pigment loading dramatically reduced development latitude.

Table 1 below shows similar trends for C-zone, showing the required development voltage to reach the required OD on the two papers was much higher for both the toner of Comparative Example 1 and with the 4 μm toner of Comparative Example 2, than with the hyper-pigmented toner of Example 1. Indeed, the toners of Comparative Example 1 and Comparative Example 2 hit the upper useful voltage limit for the DC250 machine of 400 volts, and thus those toners had narrow C-zone TC latitude, while the hyperpigmented toner of Example 1 had a wider TC latitude, below 8% TC.

TABLE 1

| | DCEG Paper | | CX+ Paper | |
|---|---|---|---|---|
| Toner | Vdev @12% TC | Vdev @8% TC | Vdev @12% TC | Vdev @8% TC |
| Example 1 | 170 V | 250 V | 200 V | 300 V |
| Comparative Example 1 | 320 V | 350 V | 370 V | 400 V |
| Comparative Example 2 | 275 V | 400 V | 350 V | 460 V |

Vdev = voltage for development

Image Layer Thickness

Solid area prints were made from the 5.8 μm toner of Comparative Example 1, and the small 4.0 μm toner of Comparative Example 2 in a DC250 electrophotographic machine from XEROX® Corporation. The thicknesses of the images were measured using a Micro Photonics NANOVEA ST400. The analysis of the toner layer thickness for a 100% solid patch is shown below in Tables 2-4 for images on DCEG paper. The control 5.8 μm toner of Comparative Example 1, before fusing, was about 6.1 μm thick. This was slightly thicker than expected, which might be due to some formation of a second layer, where some toner packed on top of others. After fusing, as the toner flowed and spread, the thickness was about a 4.4 μm layer on the paper. There was a fair amount of variability in layer thickness from measurement to measurement, indicating the non-uniformity of the layer and paper. The final layer thickness was about 70% of the initial toner unfused layer thickness, or about 75% of the toner diameter.

For the 4.0 μm toner of Comparative Example 2, the layer thickness on the paper before fusing was about 4.1 μm thick. After fusing, as the toner flowed and spread, the thickness was about a 2.9 μm layer on the paper. Again, the final fused layer thickness was about 70% of the unfused toner layer thickness, or about 73% of the toner particle diameter.

For the 5.9 μm toner of Example 1, the layer thickness before fusing was about 5.4 μm. This was slightly smaller than expected for 5.9 μm toner. As the hyper-pigmented toner was a sub-monolayer, there was very little toner in a second layer, which was one reason why the unfused toner layer for the hyper-pigmented toner was thinner than the control toner of about the same size (Comparative Example 1). After fusing, as the toner flowed and spread, the thickness was about a 2.9 μm layer on the paper. For the toner of the present disclosure, the final fused layer thickness was about 50% of the initial toner thickness measured on the paper, and about 45% of the toner diameter as measured in the COULTER COUNTER.

TABLE 2

Comparative Example 1, 5.5% PB15:3

| Toner | Thickness Before Fusing (μm) | Thickness After Fusing (μm) | Ratio of Thickness After Fusing to Thickness Before Fusing |
|---|---|---|---|
| Sample 1 | 5.82 | 4.71 | |
| Sample 2 | 5.38 | 3.77 | |
| Sample 3 | 5.88 | 4.44 | |
| Sample 4 | 7.48 | 4.53 | |
| Average | 6.14 | 4.36 | 0.71 |

TABLE 3

Comparative Example 2, 7.98% PB15:3

| Toner Type | Thickness Before Fusing (μm) | Thickness After Fusing (μm) | Ratio of Thickness After Fusing to Thickness Before Fusing |
|---|---|---|---|
| Sample 1 | 4.10 | 2.57 | |
| Sample 2 | 4.97 | 4.10 | |
| Sample 3 | 4.16 | 2.18 | |
| Sample 4 | 3.28 | 2.74 | |
| Average | 4.13 | 2.90 | 0.70 |

TABLE 4

| Example 1, 7.98% PB15:3 | | | |
|---|---|---|---|
| Toner Type | Thickness Before Fusing (μm) | Thickness After Fusing (μm) | Ratio of Thickness After Fusing to Thickness Before Fusing |
| Sample 1 | 5.91 | 2.62 | |
| Sample 2 | 5.24 | 2.40 | |
| Sample 3 | 4.83 | 2.45 | |
| Sample 4 | 5.63 | 3.09 | |
| Average | 5.40 | 2.64 | 0.49 |

The above data in Tables 2-4 demonstrate that in typical printing of solid areas with conventional toners, the single color 100% patch layer thickness to toner diameter ratio was the same, about 0.70 to 0.71 in Table 2 and Table 3, while for the toner of the present disclosure, it was lower, about 0.5 times the toner particle size in Table 4.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A toner comprising [low melt] emulsion aggregation toner particles having a core and a shell, wherein the *emulsion aggregation* toner particles comprise:

*a combination of amorphous polyester resins comprising a first amorphous polyester resin and second amorphous polyester resin, the first amorphous polyester resin comprising dodecenylsuccinic acid, the first and second amorphous polyester resins each having a number average molecular weight* ($M_n$) *of from about 2,000 to about 8,000, the combination of amorphous polyester resins having a melt viscosity of from about 10 to about 1,000,000 Pa*S at about 130° C;*

[a low molecular weight amorphous polyester resin which exhibits a glass transition temperature of from about 30° C. to about 120° C. and having a number average molecular weight (Mn) of from about 2,000 to about 8,000, the low molecular weight amorphous polyester resin comprises a combination of low molecular weight amorphous polyester resins,] wherein [the] *at least one of the* amorphous polyester [resin] *resins* is present in an amount of from about 30% to *about* 45% by weight of the *emulsion aggregation* toner particles[, and further wherein the combined amorphous polyester resins have a melt viscosity of from about 10 to about 1,000,000 Pa*S at about 130° C.];

a crystalline polyester resin which exhibits a melting temperature of from about 50° C. to about 90° C.; and a [pigment] *colorant* present in an amount of from about 7% to about 40% by weight of the toner;

wherein the emulsion aggregation toner particles have a volume average particle diameter of about 2 μm to about 7 μm;

further wherein the toner possesses a toner charge per mass ratio (Q/m) of from about −3 [ρC] *μC*/gram to about −90 [ρC] *μC*/gram.

2. The toner of claim 1, wherein [the] *at least one of the* amorphous polyester [resin] *resins* comprises [the following] *a linear amorphous polyester having* formula (I):

(I)

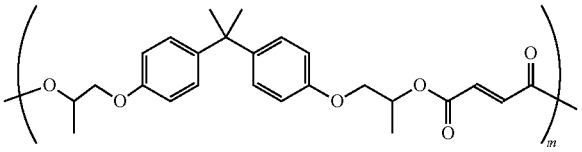

wherein m is from about 5 to about 1000.

3. The toner of claim 1, wherein the crystalline polyester resin is present in an amount of from 1% to about 15% by weight of the *emulsion aggregation* toner particles.

4. The toner of claim 1, wherein the crystalline polyester resin comprises [the following formula] *a polyester having formula (II)*:

(II)

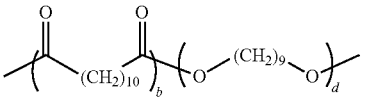

wherein b is from about 5 to about 2000[;], and d is from about 5 to about 2000.

5. The toner of claim 1, wherein the *colorant is a* pigment [is] present in an amount of from about 10% to about 18% by weight of the toner.

6. The toner of claim 1, wherein the [low melt] emulsion aggregation toner particles are dry, and the [dry] *emulsion aggregation* toner particles*, when dry,* have a number average geometric standard deviation (GSDn) and/or volume average geometric standard deviation (GSDv) of from about 1.05 to about 1.55.

7. The toner of claim 1, wherein the [low melt] emulsion aggregation toner particles are dry, and the [dry] *emulsion aggregation* toner particles*, when dry,* have a glass transition temperature of from about 40° C. to about 65° C.

*8. The toner of claim 1, wherein the colorant comprises a pigment, a dye, a mixture of pigment and dye, a mixture of pigments, or a mixture of dyes.*

*9. The toner of claim 1, wherein the emulsion aggregation toner particles have a volume average particle diameter of from about 2 μm to about 5 μm.*

*10. The toner of claim 9, wherein the emulsion aggregation toner particles have a volume average particle diameter of from about 3.5 μm to about 5 μm.*

*11. The toner of claim 1, wherein the combination of amorphous polyester resins has a glass transition temperature of from about 30° C. to about 80° C.*

*12. The toner of claim 1, wherein each amorphous polyester resin is present in an amount of from about 30% to about 45% by weight of the emulsion aggregation toner particles.*

*13. The toner of claim 1, wherein the first amorphous polyester resin has a weight average molecular weight* ($M_w$) *of from about 10,000 to about 30,000.*

14. The toner of claim 13, wherein the first amorphous polyester resin has a molecular weight distribution ($M_w/M_n$) of from about 2 to about 6.

15. The toner of claim 1, wherein the second amorphous polyester resin has a weight average molecular weight ($M_w$) of from about 55,000 to about 150,000.

16. The toner of claim 15, wherein the second amorphous polyester resin has a molecular weight distribution ($M_w/M_n$) greater than about 4.

17. The toner of claim 1, wherein the first amorphous polyester resin has an acid value from about 9 mg KOH/g to about 16 mg KOH/g.

18. The toner of claim 1, wherein the second amorphous polyester resin has an acid value from about 9 mg KOH/g to about 16 mg KOH/g.

19. The toner of claim 1, wherein the emulsion aggregation toner particles further comprise a wax present in an amount of from about 5% to about 20% by weight of the emulsion aggregation toner particles.

20. A toner comprising emulsion aggregation toner particles having a core and a shell, wherein the emulsion aggregation toner particles comprise:

a combination of amorphous polyester resins comprising a first amorphous polyester resin and a second amorphous polyester resin, the first amorphous polyester resin comprising trimellitic acid, the first and second amorphous polyester resins each having a number average molecular weight ($M_n$) of from about 2,000 to about 8,000, the combination of amorphous polyester resins having a melt viscosity of from about 10 to about 1,000,000 Pa*S at about 130° C. and a glass transition temperature of from about 30° C. to about 80° C.;

wherein at least one of the first and second amorphous polyester resins is present in an amount of from about 30% to about 45% by weight of the emulsion aggregation toner particles;

a crystalline polyester resin which exhibits a melting temperature of from about 50° C. to about 90° C.;

wherein the crystalline polyester resin is present in an amount of from 1% to about 15% by weight of the emulsion aggregation toner particles; and a colorant present in an amount of from about 7% to about 40% by weight of the toner;

wherein the emulsion aggregation toner particles have a volume average particle diameter of about 4 μm to about 6 μm, and wherein the toner possesses a toner charge per mass ratio (Q/m) of from about −3 μC/gram to about −90 μC/gram.

21. The toner of claim 20, wherein each amorphous polyester resin is present in an amount of from about 30% to about 45% by weight of the emulsion aggregation toner particles.

22. The toner of claim 20, wherein the colorant comprises a pigment, a dye, a mixture of pigment and dye, a mixture of pigments, or a mixture of dyes.

23. The toner of claim 20, wherein the colorant is a pigment present in an amount of from about 10% to about 18% by weight of the toner.

24. The toner of claim 20, wherein the first amorphous polyester resin has a weight average molecular weight ($M_w$) of from about 10,000 to about 30,000.

25. The toner of claim 24, wherein the first amorphous polyester resin has a molecular weight distribution ($M_w/M_n$) of from about 2 to about 6.

26. The toner of claim 20, wherein the second amorphous polyester resin has a weight average molecular weight ($M_w$) of from about 55,000 to about 150,000.

27. The toner of claim 26, wherein the second amorphous polyester resin has a molecular weight distribution ($M_w/M_n$) greater than about 4.

28. The toner of claim 20, wherein the first amorphous polyester resin has an acid value from about 9 mg KOH/g to about 16 mg KOH/g.

29. The toner of claim 20, wherein the second amorphous polyester resin has an acid value from about 9 mg KOH/g to about 16 mg KOH/g.

30. The toner of claim 20, wherein the emulsion aggregation toner particles further comprise a wax present in an amount of from about 5% to about 20% by weight of the emulsion aggregation toner particles.

31. A toner comprising emulsion aggregation toner particles having a core and a shell, wherein the emulsion aggregation toner particles comprise:

a combination of amorphous polyester resins comprising a first amorphous polyester resin and a second amorphous polyester resin, the first amorphous polyester resin comprising dodecenylsuccinic acid, the second amorphous polyester resin comprising trimellitic acid, the first and second amorphous polyester resins each having a number average molecular weight ($M_n$) of from about 2,000 to about 8,000, the combination of amorphous polyester resins having a melt viscosity of from about 10 to about 1,000,000 Pa*S at about 130° C. and a glass transition temperature of from about 30° C. to about 80° C.;

wherein the second amorphous polyester resins is present in an amount of from about 35% to about 45% by weight of the emulsion aggregation toner particles;

a crystalline polyester resin which exhibits a melting temperature of from about 50° C. to about 90° C.; and a colorant present in an amount of from about 7% to about 40% by weight of the toner;

wherein the emulsion aggregation toner particles have a volume average particle diameter of about 2 μm to about 7 μm, and the toner possesses a toner charge per mass ratio (Q/m) of from about −3 μC/gram to about −90 μC/gram.

32. The toner of claim 31, wherein the emulsion aggregation toner particles have a volume average particle diameter of from about 2 μm to about 5 μm.

33. The toner of claim 32, wherein the emulsion aggregation toner particles have a volume average particle diameter of from about 3.5 μm to about 5 μm.

34. The toner of claim 31, wherein the crystalline polyester resin is present in an amount of from 1% to about 15% by weight of the emulsion aggregation toner particles.

35. The toner of claim 31, wherein each amorphous polyester resin is present in an amount of from about 35% to about 45% by weight of the emulsion aggregation toner particles.

36. The toner of claim 31, wherein the colorant is a pigment present in an amount of from about 10% to about 18% by weight of the toner.

37. The toner of claim 31, wherein the colorant comprises a pigment, a dye, a mixture of pigment and dye, a mixture of pigments, or a mixture of dyes.

38. The toner of claim 31, wherein the first amorphous polyester resin has a weight average molecular weight ($M_w$) of from about 10,000 to about 30,000.

*39. The toner of claim 31, wherein the first amorphous polyester resin has a molecular weight distribution ($M_w/M_n$) of from about 2 to about 6.*

*40. The toner of claim 31, wherein the second amorphous polyester resin has a molecular weight distribution ($M_w/M_n$) greater than about 4.*

*41. The toner of claim 31, wherein the first amorphous polyester resin has an acid value from about 9 mg KOH/g to about 16 mg KOH/g.*

*42. The toner of claim 31, wherein the second amorphous polyester resin has an acid value from about 9 mg KOH/g to about 16 mg KOH/g.*

*43. The toner of claim 31, wherein the emulsion aggregation toner particles further comprise a wax present in an amount of from about 5% to about 20% by weight of the emulsion aggregation toner particles.*

* * * * *